United States Patent [19]

Suganuma

[11] Patent Number: 5,179,311
[45] Date of Patent: Jan. 12, 1993

[54] DRIVE CIRCUIT FOR ULTRASONIC MOTORS

[75] Inventor: Ryoichi Suganuma, Yokohama, Japan

[73] Assignee: Nikon Corporation, Tokyo, Japan

[21] Appl. No.: 661,617

[22] Filed: Feb. 28, 1991

[30] Foreign Application Priority Data

Mar. 1, 1990 [JP] Japan .................................. 2-52228

[51] Int. Cl.[5] ............................................. H01L 41/08
[52] U.S. Cl. .................................... 310/316; 310/317; 318/116
[58] Field of Search ................... 310/316, 317; 318/116

[56] References Cited

U.S. PATENT DOCUMENTS

| | | | |
|---|---|---|---|
| 3,271,644 | 9/1966 | McShane | 310/316 |
| 3,683,212 | 9/1972 | Zoltan | 310/317 |
| 3,989,963 | 11/1976 | Giaccardi | 310/317 |
| 4,228,440 | 10/1980 | Horike et al. | 310/317 |
| 4,249,100 | 2/1981 | Vasiliev et al. | 310/317 |
| 4,510,411 | 4/1985 | Hakamata et al. | 310/316 |
| 4,595,854 | 6/1986 | Yano et al. | 310/317 |
| 4,767,959 | 8/1988 | Sakakibara et al. | 310/317 |
| 4,866,326 | 9/1989 | Niikawa et al. | 310/316 |
| 4,947,074 | 8/1990 | Suzuki | 310/316 |

FOREIGN PATENT DOCUMENTS 0289682 12/1986 Japan ................... 310/317

OTHER PUBLICATIONS

*Nikkei Mechanical*, Feb. 28, 1983, pp. 44–49.

Primary Examiner—Mark O. Budd
Assistant Examiner—Thomas M. Dougherty
Attorney, Agent, or Firm—Shapiro and Shapiro

[57] ABSTRACT

A drive circuit for an ultrasonic motor, which comprises a stator for generating a progressive oscillatory wave to an elastic element with the drive of a piezoelectric element and a moving element to be pressurized by the stator and driven with the progressive oscillatory wave, comprises an inductive element which is inserted between a power source and an input of the ultrasonic motor, and a switching element which is connected between one end of said inductive element connected to said input and a ground, and performs switching with a drive frequency of said ultrasonic motor.

4 Claims, 9 Drawing Sheets

DRIVE CIRCUIT FOR ULTRASONIC MOTORS

BACKGROUND OF THE INVENTION

1. Field of the Invention

The present invention relates to a drive circuit for ultrasonic motors.

2. Related Background Art

The configuration of an ultrasonic motor is described briefly in conjunction with FIG. 9.

FIG. 9 shows a cross section of an ultrasonic motor. A moving element is formed with a rotor 100-1 and a sliding element 100-2 which are adhered each other. A stator is formed with an elastic element 100-3 and a piezoelectric element 100-4 which are adhered each other. The moving element and stator are pressurized for use by a pressurizing mechanism (not illustrated).

FIG. 10 shows the layout of electrodes in the piezoelectric element 100-4. Electrodes 100-4a and 100-4b are inputs, to which cyclic voltages having a phase difference of $\pi/2$ are applied. An electrode 100-4c is a common base connected to a ground. An electrode 100-4d does not contribute to the drive of the elastic element, which is used to pick up a monitor voltage.

As mentioned above, an ultrasonic motor consists of a rotor, a sliding element, an elastic element, and a piezoelectric element. Then, driving voltages which are mutually out of phase are input to electrodes 100-4a and 100-4b of the piezoelectric element. This causes the piezoelectric element 100-4 to drive and the elastic element 100-3 to generate a progressive oscillatory wave. Finally, a moving element pressurized to a stator is driven. The configuration and operations of this kind of an ultrasonic motor have already been disclosed in Nikkei Mechanical issued in Feb. 28th, 1983, or the U.S. Pat. No. 4,510,411 owned by the assignee.

For this kind of an ultrasonic motor, a high voltage must be applied to an input. Known prior drive circuits adopt the methods (1) to (3) below to generate a high voltage. That is to say, (1) a sine wave is amplified and applied to an input, (2) a primary voltage is boosted by a transformer and applied to an input, and (3) a square wave is supplied to an input via an inductive element.

In the method (1) that a sine wave is amplified and applied to an input, the configuration of an amplifier becomes complex. A high voltage is required for the power supply to the amplifier. The driving efficiency is low for the supply source of power.

In the method (2) of using a transformer, the transformer must be modified to match an ultrasonic motor. The versatility is poor. In some cases, many elements are required for a circuit which drives the transformer.

In the method (3) that a square wave is supplied to an input via an inductive element, the configuration of a power amplifier which outputs the square wave becomes complex.

FIG. 11 shows an example of a known drive circuit using the aforesaid method (3). An input signal is a square wave having the drive frequency of an ultrasonic motor. In response to the square wave, output transistors 108 and 109 are driven. This makes it necessary to amplify the input signal. Therefore, an amplification circuit for an input signal as shown in FIG. 11 is indispensable. This increases circuit elements in number and makes the circuit configuration more complex. In FIG. 11, 101, 103, and 105 are resistors. 102, 104, 106, 107, and 109 are transistors. 110 and 111 are diodes, and 112, an inductive element.

In this drive circuit, a self-capacitance of an ultrasonic motor input and an inductive element 112 cause a series resonance phenomenon. This boosts the DC supply voltage applied to a drive circuit and changes a square wave or an output voltage wave of an output transistor into a voltage wave approximated to a sine wave. However, an engineer, who belongs to this assignee, failed to set the inductive element value to any value under such a condition that the inductive element value must be determined in such a way that the series resonance frequency caused by the inductive element and self-capacitance will be set to a value approximate to the resonance frequency of the ultrasonic motor.

A drive voltage is determined by the drive frequency of an ultrasonic motor, a self-capacitance, and a DC supply voltage. If the DC power supply consists of batteries and a low-tension cyclic voltage only is applied to a drive circuit, the drive frequency and inductive element value must be high. Under this condition, the supply voltage cannot be boosted enough to be a drive voltage necessary for driving an ultrasonic motor. Therefore, if the aforesaid series resonance phenomenon cannot boost a drive voltage, or if a high-tension drive voltage is required to drive an ultrasonic motor sufficiently, a high-tension power supply is used, or a booster circuit is needed for boosting an output voltage of batteries or other power supply to obtain a high voltage. If the drive voltage must be variable, the voltage value of the DC power supply to the drive circuit must be variable.

SUMMARY OF THE INVENTION

The object of the invention is to boost an input signal sufficiently without using a high-tension power supply or configuring a complex circuit, and thereby generate a high-tension cyclic voltage signal.

According to one aspect of the invention in achieving the above object, a drive circuit for an ultrasonic motor, which consists of a state for generating a progressive oscillating wave to an elastic element with the drive of a piezoelectric element, and a moving element to be pressurized by the stator and driven with the progressive oscillating wave, comprises inductive elements which are inserted between a power supply and inputs of an ultrasonic motor, switching means which is connected between one ends of the inductive elements connected to the inputs and a ground, and performs switching with the drive frequency of the ultrasonic motor.

A switching element performs switching with the drive frequency of an ultrasonic motor. Thereby, a self-capacitance contained in an input of the ultrasonic motor appears, and a high-tension cyclic voltage is generated by the series resonance of the inductor of an inductive element. The cyclic voltage is applied to the input of a piezoelectric element as a drive voltage. Thereby, the ultrasonic motor is driven.

According to another aspect of the invention, an ultrasonic motor drive circuit comprises first and second inductive elements which are connected in series and inserted between a power supply and inputs of an ultrasonic motor, switching elements each of which is connected between the joint of the first and second inductive elements and a ground, and performs switching the joint with the drive frequency of the ultrasonic motor, and capacitive elements each of which is connected in parallel with the switching element.

When a switching element switches the joint of first and second inductive elements with the drive frequency of an ultrasonic motor, the resonant effect of a first inductive element and a capacitive element develops a boosted cyclic voltage at the joint. This cyclic voltage is further boosted due to the resonant effect of the self-capacitance of an ultrasonic motor and a second inductive element. As a result, a higher cyclic voltage approximated to a sine wave appears at the input of the second inductive element.

DETAILED DESCRIPTION OF THE PREFERRED EMBODIMENTS

Preferred embodiments of the invention are described below in conjunction with the drawings.

Figure 1:
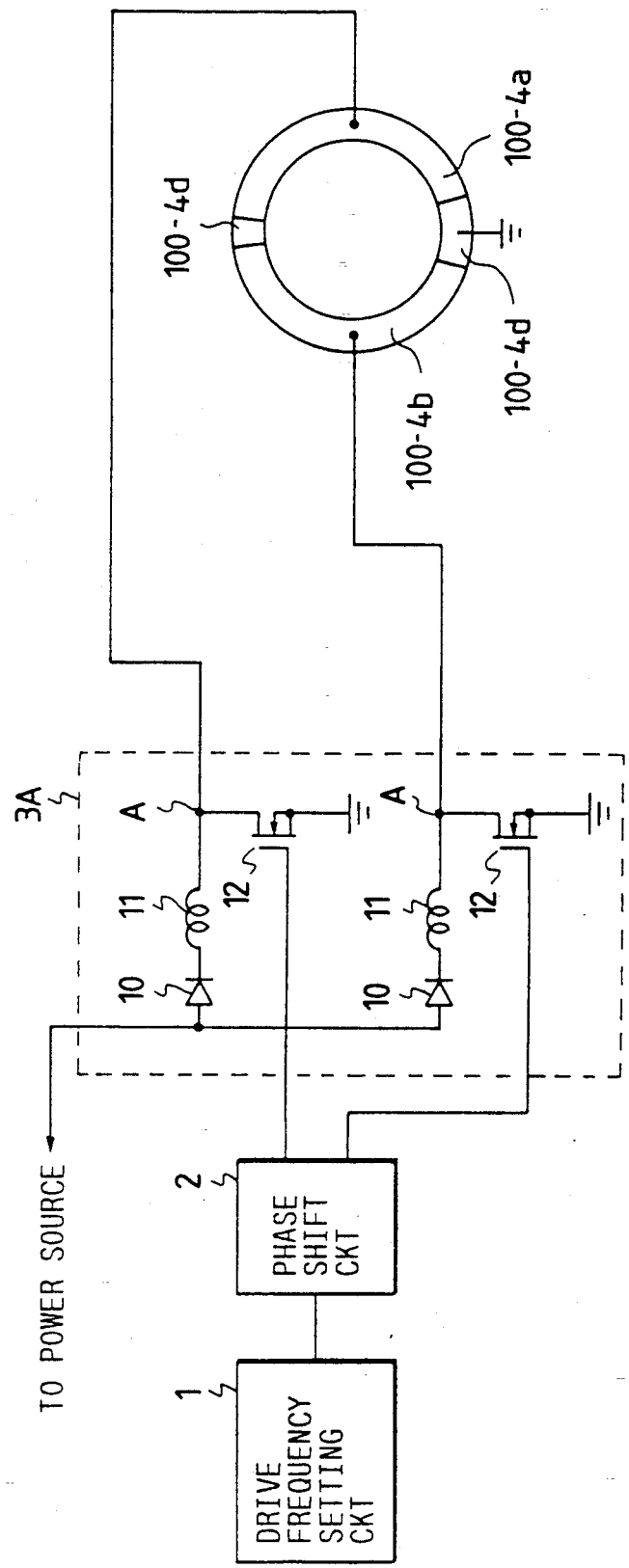
FIG. 1 shows an overall configuration of a first embodiment of the invention.

FIG. 1 shows a first embodiment. An ultrasonic motor drive unit is composed of a drive frequency setting circuit 1, a phase shift circuit 2, and a drive circuit 3A. The drive frequency setting circuit 1 provides an output of a cyclic signal. The frequency of the cyclic signal corresponds to the drive frequency of the ultrasonic motor. The phase shift circuit 2 provides the outputs of the drive frequency setting circuit 1 to the drive circuit 3 as cyclic signals which are mutually $\pi/2$ out of phase. The drive circuit 3A comprises diodes 10, inductive elements 11, and switching elements 12. The outputs of the phase shift circuit 2 are used as drive signals for the switching elements 12. MOSFET is used as the switching element 12, but other elements may be used.

Figure 2:
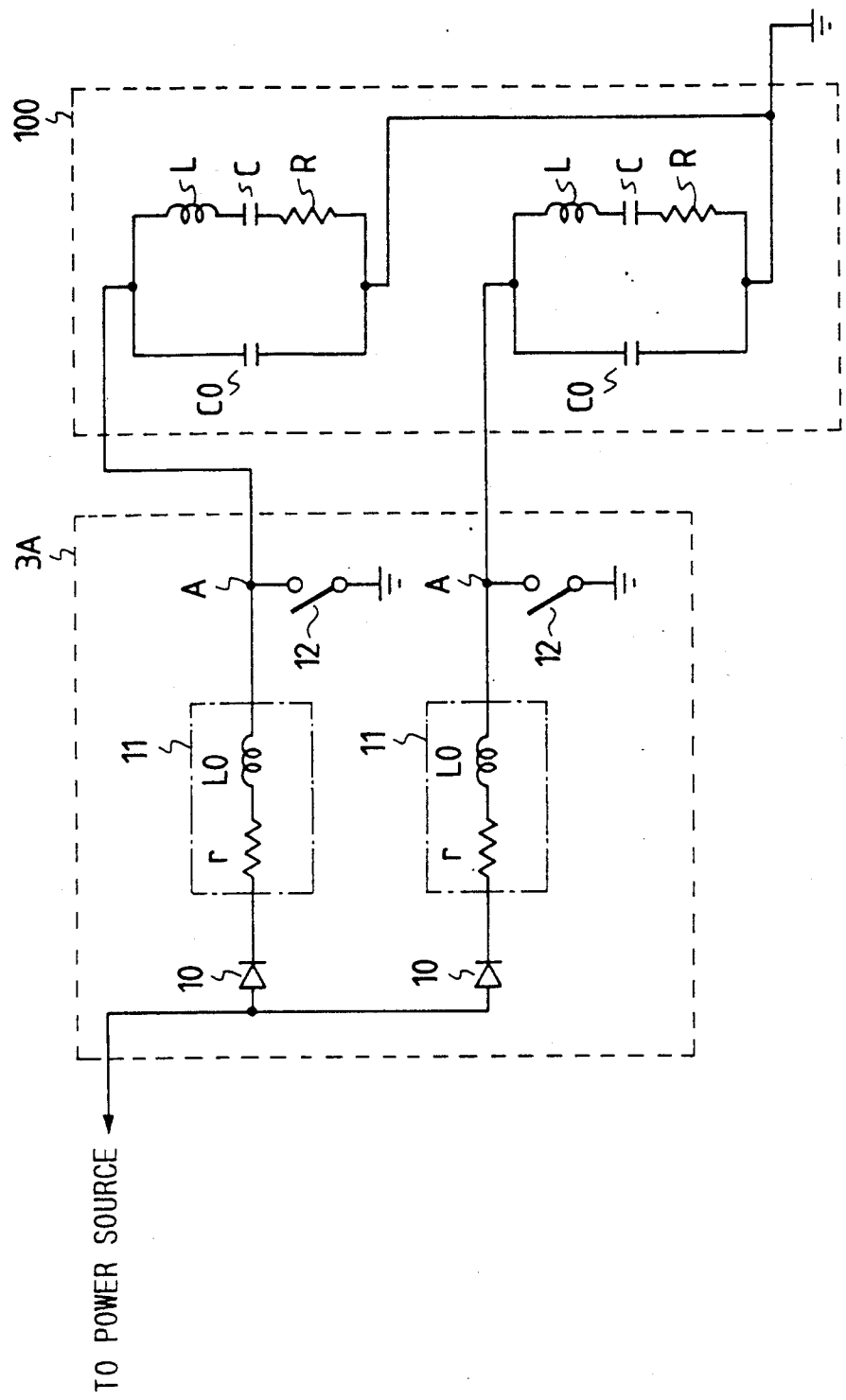
FIG. 2 shows an equivalent circuit of the main portion of FIG. 1.

FIG. 2 shows an equivalent circuit to a drive circuit 3. The portions encircled with dot lines are the equivalent circuit of an ultrasonic motor 100. C0 is a self-capacitance. A series resonance circuit formed with L, C, and R, presumably, relates to the drive of the ultrasonic motor. An inductive element 11 is represented by L0 and r equivalently. r is an internal resistance of the inductive element. A switch 12 represents a switching element 12 equivalently. In the equivalent circuit of FIG. 2, if the aforesaid series resonance circuit is recognized as a load, the inductive element 11, switch 12, and self-capacitance C0 constitute a known booster circuit. When the switch is held ON, the energy accumulated in L0 is discharged to the self-capacitance C0 with an OFF operation of the switch. This develops a high voltage at a point A or an input of the ultrasonic motor. A high-tension cyclic voltage can be generated by disconnecting the switch 12 cyclically.

Figure 3:
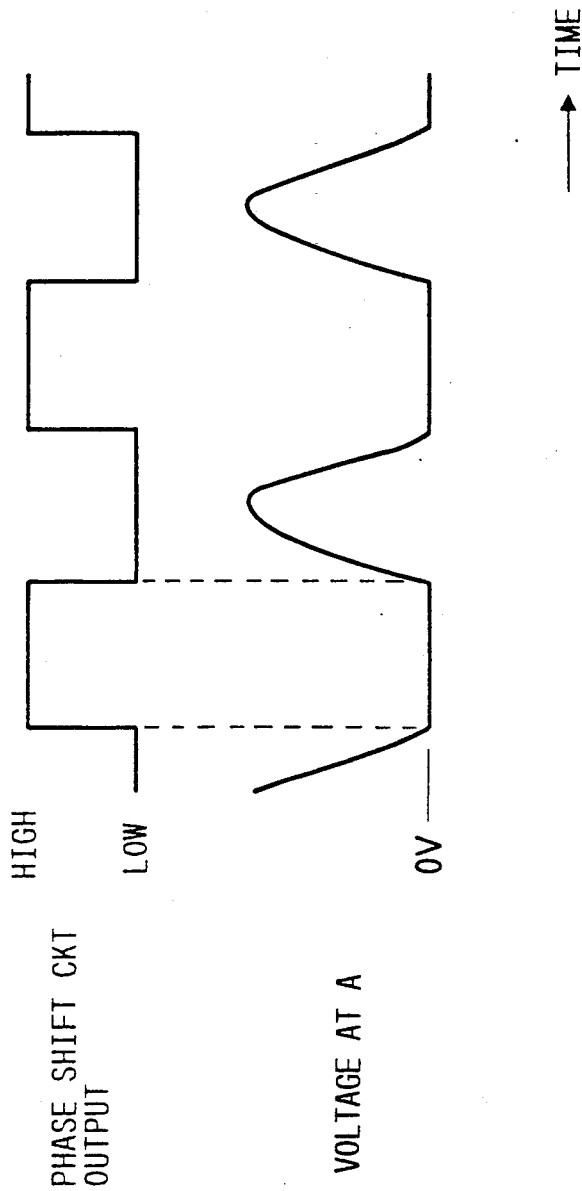
FIG. 3 is a timing chart showing waves at two points of FIG. 1.

FIG. 3 shows the operation waves at points of the drive circuit shown in FIG. 1.

When the output of a phase shift circuit 2 is high, a switching element 12 is conducting. The potential at a point A in FIG. 1 becomes 0 V. Thereby, current starts flowing from a power supply to an inductive element 11, and energy accumulated in an input of an ultrasonic motor is discharged.

Next, when the output of the phase shift circuit 2 is driven low inversely, the switching element 12 becomes non-conducting. When the switching element 12 is non-conducting, the energy accumulated in the inductive element 11 is input to a self-capacitance of an input. Therefore, the potential at the point A goes up. Meanwhile, the energy is consumed to drive the ultrasonic motor. Therefore, the potential at the point A starts declining in a certain time. When the output of the phase shift circuit 2 is driven high again, the switching element 12 becomes conducting. Current flows into the inductive element 11 again. The aforesaid operations are repeated. A high-tension cyclic voltage is applied to an input of the ultrasonic motor. Then, the ultrasonic motor is driven.

A diode 10 is a rectifying device, which prevents the back flow of current into the power supply. The diode 10 may be connected between the point A and the inductive element 11, or may sometimes not be used.

The value for the inductive element 11 may be obtained experimentally. If the inductive element having the value thus obtained is not available, a capacitive element may be connected between the point A and a ground in FIG. 2 to adjust the inductive element value.

Figure 11:
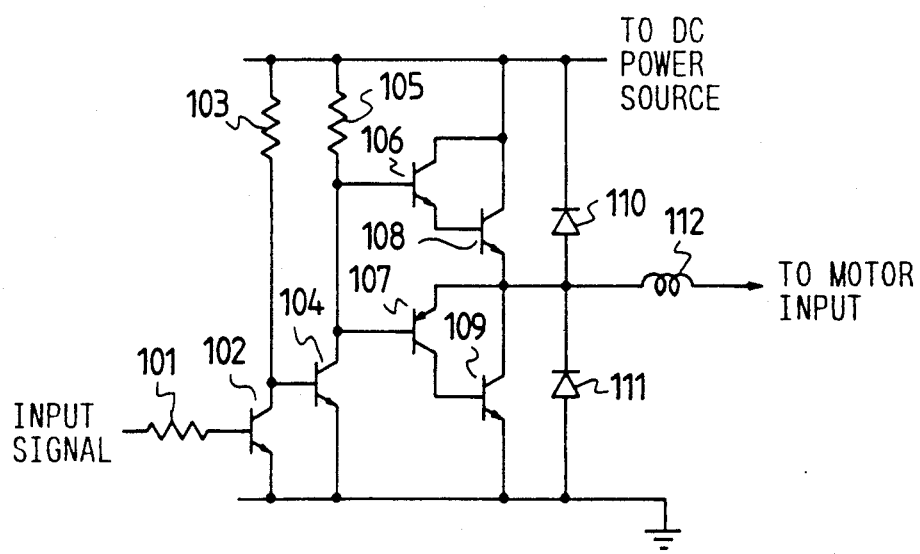
FIG. 11 shows an example of a prior drive circuit.

According to the first embodiment, some commercially available parts are used to constitute an ultrasonic motor drive circuit easily. Only by modifying the inductive element value, a versatile drive circuit which can be adopted in other ultrasonic motor drive circuits having different drive frequencies can be provided. Unlike the prior example shown in FIG. 11, the inductive element value can be modified, and the drive voltage applied to an input of an ultrasonic motor can be made variable easily. If the inductive element value is made smaller, the drive voltage can be boosted to be a high voltage easily.

Figure 4:
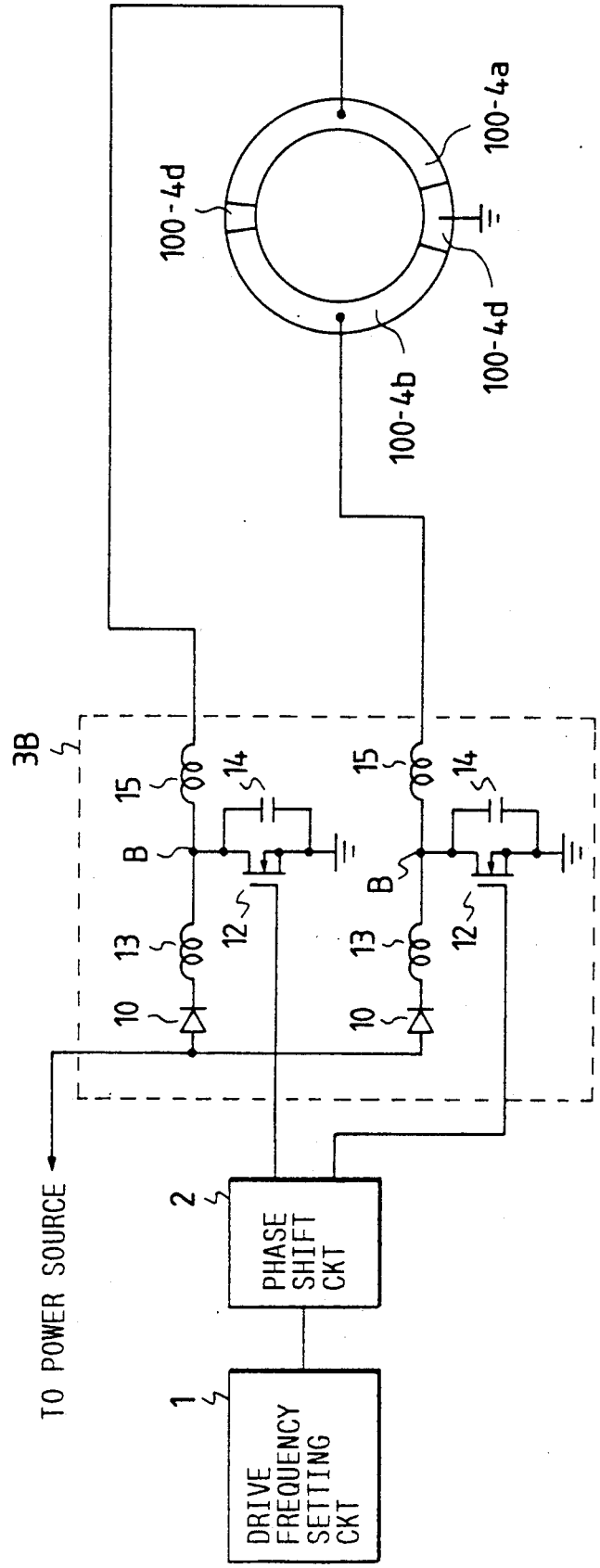
FIG. 4 shows an overall configuration of a second embodiment of the invention.

Next, the second embodiment is described using FIG. 4. The same components as those in FIG. 1 are assigned the same references and symbols. The differences are described. A drive frequency setting circuit 1 and a phase shift circuit 2 are identical to those in the first embodiment. A drive circuit 3B is composed of first inductive elements 13, switching elements 12, capacitive elements 14, second inductive elements 15, and diodes 10. The switching elements 12 use the outputs of the phase shift circuit 2 as drive signals.

In this drive circuit, a first inductive element 13, a switching element 12, and a capacitive element 14 constitute a booster circuit similar to the one of the first embodiment which comprises an inductive element 11, a switching element 12, and a self-capacitance of an ultrasonic motor input. High-tension cyclic voltages developed at points B in FIG. 4 are applied to inputs 100-4a and 100-4b of an ultrasonic motor via the second inductive elements 15. Then, the series resonance of each second inductive element 13 and the self-capacitance of each input further boosts the cyclic voltage developed at each point B. The voltage wave is approximated to a sine wave.

Figure 5:
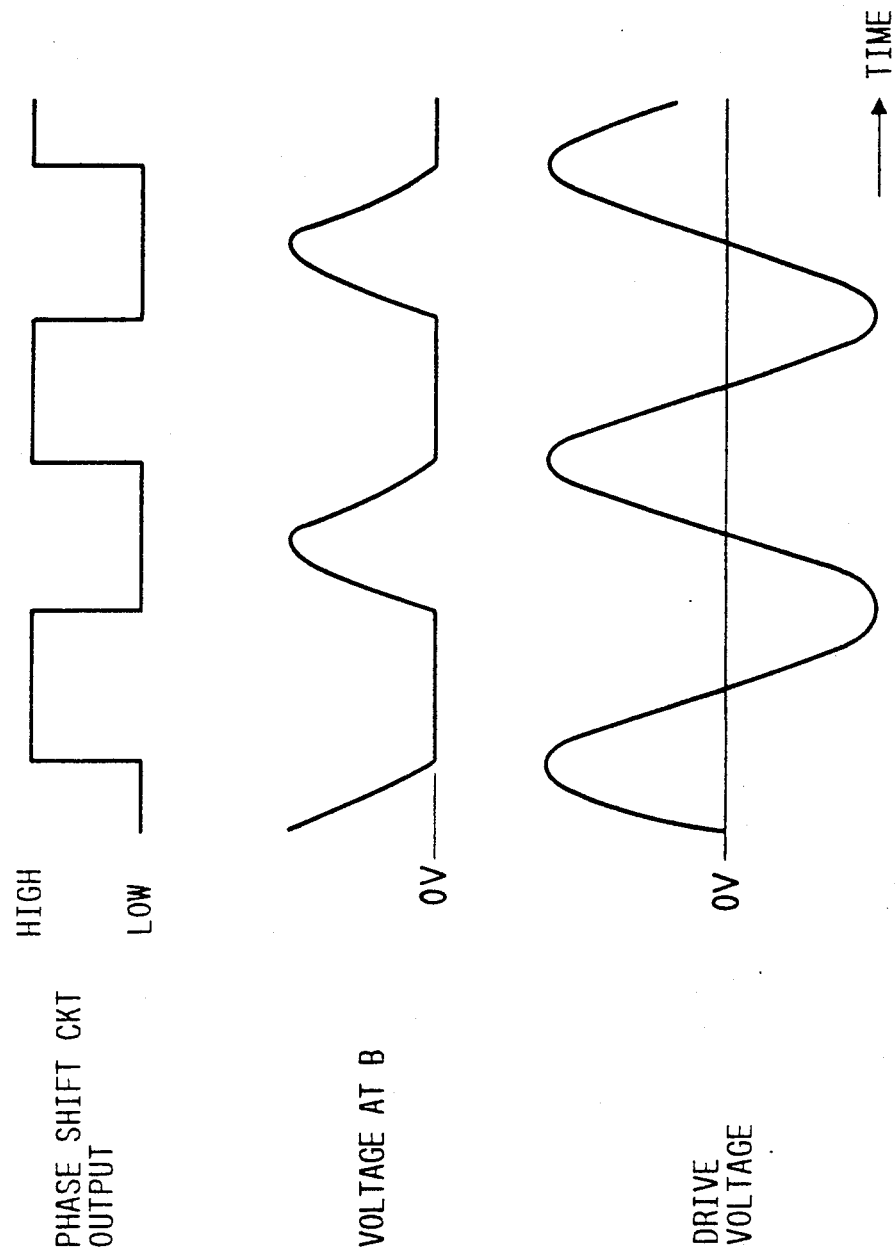
FIG. 5 is a timing chart showing waves at three points of the second embodiment.

FIG. 5 shows the waves. The power supply in FIG. 4 is positive. Therefore, the drive voltage waves shown in FIG. 5 are offset to the positive side. This is no problem unless the offset values cause a critical high voltage. To eliminate the offset values, a capacitive element is connected in series between the second inductive element 15 and input, then it is AC-coupled.

Figure 6:
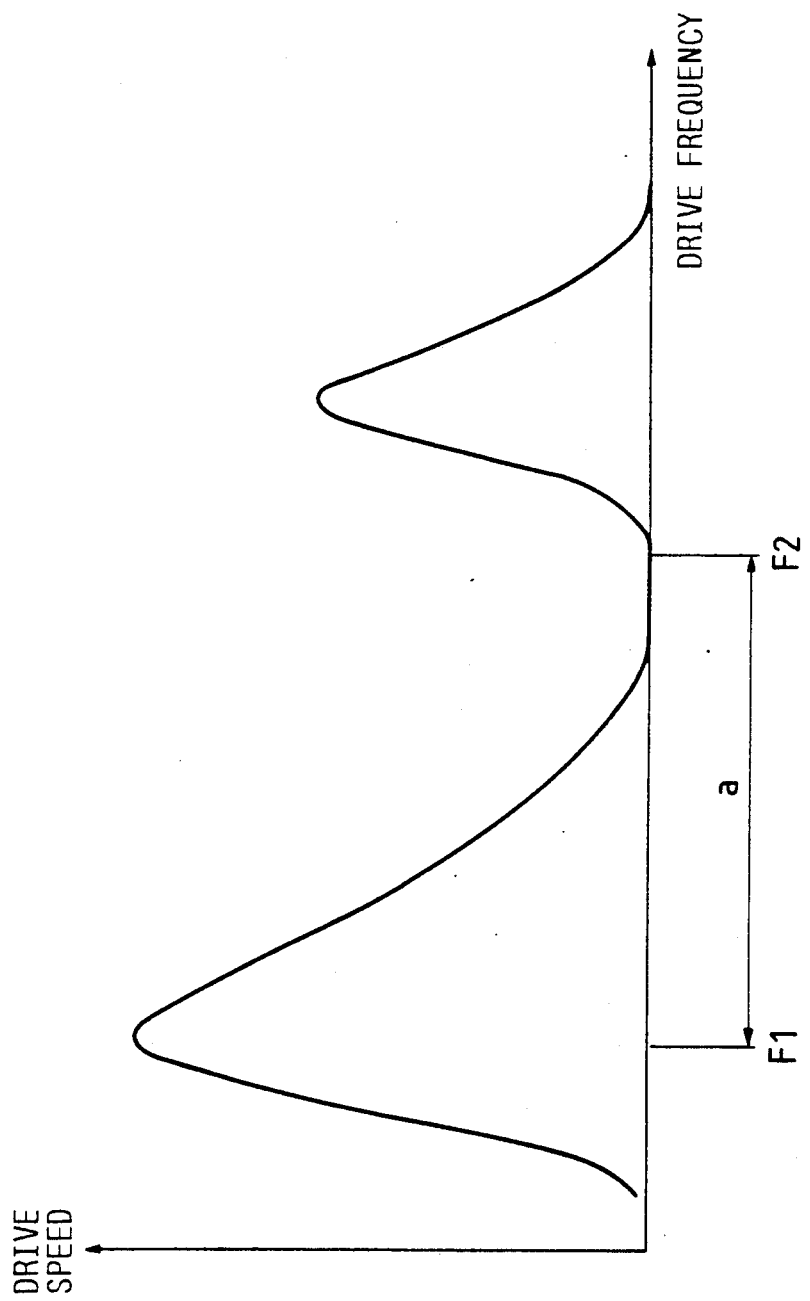
FIG. 6 is a graph showing the relationship between the drive frequency and drive speed.

Even in this kind of a drive circuit, the values for the first inductive element 13, second inductive element 15, and capacitive element 14 may be determined experimentally. According to an experiment conducted by this assignee, the value for the second inductive element 15 should preferably be set to a value so that the resonance frequency of the self-capacitance C0, and L of the inductive element $15 = 1/(2\pi\sqrt{L \cdot C0})$ will come within the range of a in FIG. 6. That is to say, as shown in FIG. 6, the range a is determined by a lower limit resonance frequency F1 and an upper limit resonance frequency F2. F1 is a resonance frequency of an ultrasonic motor, and F2 is a drive frequency which is used to drive at higher frequencies than a normally-used drive frequency.

In the second embodiment, if an exact value cannot be obtained with the second inductive element 15, a capacitive element is connected in parallel with an input to adjust the second inductive element value.

As described previously, the value for the first inductive element 13 may be obtained experimentally. If the DC supply voltage to the drive circuit is low, the value for the inductive element 13 is set lower. If the DC supply voltage is high, the value for the inductive element 13 is set higher. Thus, the inductive element value is adjusted merely to obtain a drive voltage enough to drive an ultrasonic motor. Moreover, the diode 10 can be eliminated as described in the first embodiment.

Even in the second embodiment, a drive circuit can be configured easily using commercially available parts, and adopted to other ultrasonic motors using different frequencies by modifying the first and second inductive element values and the capacitive element value. When the first inductive element value is made variable, the voltage value of a drive voltage wave applied to an input of an ultrasonic motor can be adjusted easily. When the inductive element value is set smaller, the voltage of a DC power supply applied to the drive circuit can be boosted to a sufficiently high drive voltage.

Figure 7:
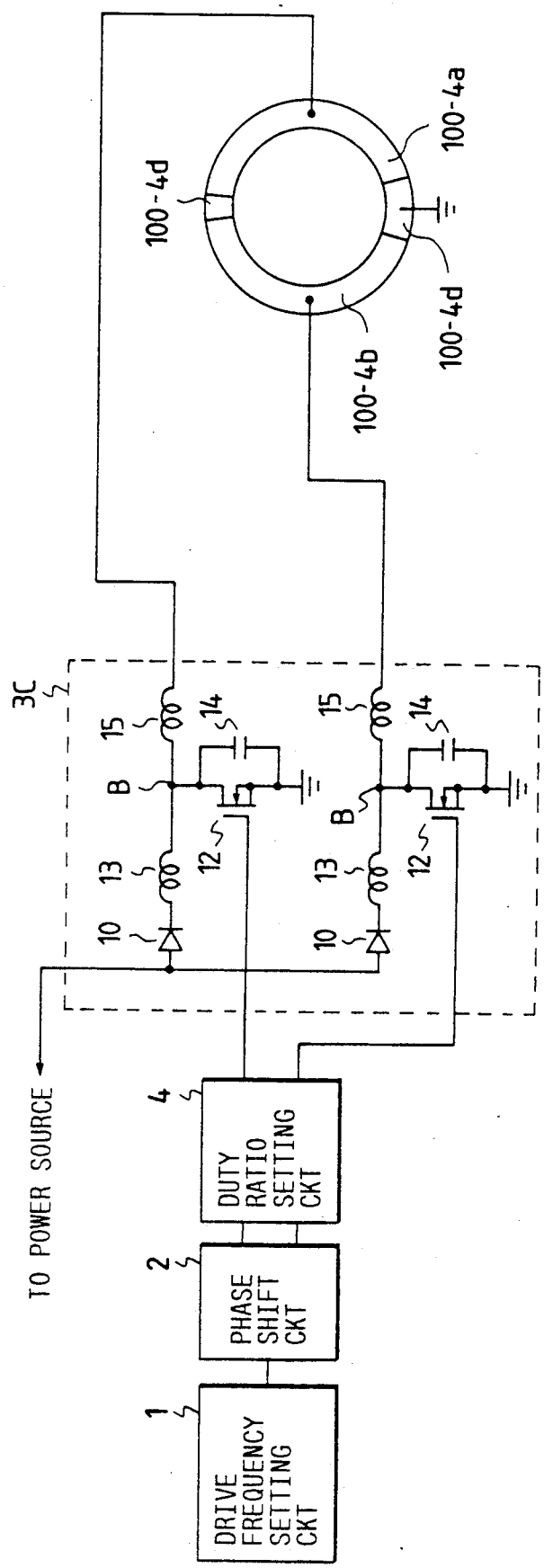
FIG. 7 shows an overall configuration of a third embodiment in which the ratio of ON and OFF periods of a switching element is changed.

FIG. 7 shows the third embodiment. The ratio per one cycle of the ON and OFF periods of a switching element 12 in the second embodiment, that is; a duty ratio, is made variable to control a drive voltage applied to an input of an ultrasonic motor.

As shown in FIG. 7, the output of a phase shift circuit 2 in the fourth embodiment is connected to a known duty ratio control circuit 4. With the output of the duty ratio control circuit 4, the switching element 12 is driven.

Figure 8:
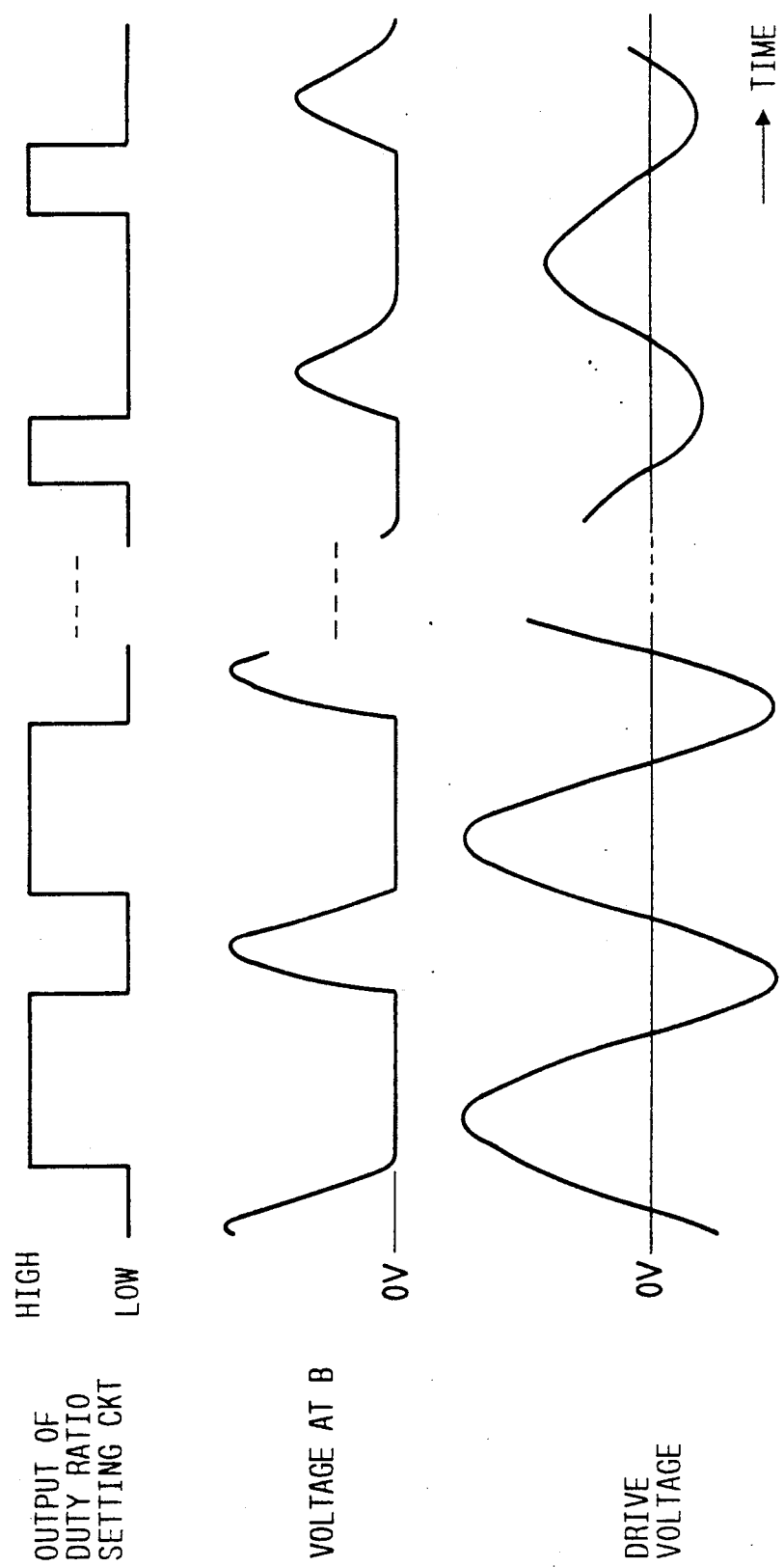
FIG. 8 is a timing chart of waves at three points of the embodiment shown in FIG. 7.
Figure 9:
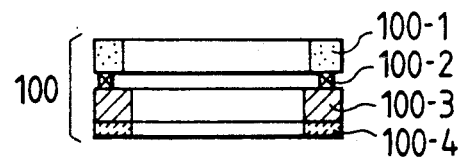
FIG. 9 shows a cross section of an ultrasonic motor.
Figure 10:
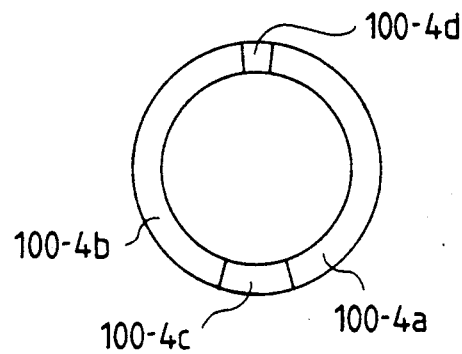
FIG. 10 shows the layout of electrodes of a piezoelectric element.

The operations of this embodiment are described below using FIG. 8.

When the ON period of a switching element 12 is extended, the energy accumulated in an inductive element 13 increases in volume. This causes a drive voltage to rise. When the ON period is shortened, the energy accumulated in the inductive element 13 is reduced in the meantime. This causes the drive voltage to drop. Then, the ratio of the ON and OFF periods of the switching element 12 is changed to make the drive voltage variable. Thereby, a drive speed is controlled. If the drive voltage is detected to control the duty ratio, the drive voltage can be controlled to be a certain voltage. Thus, the drive voltage can be refrained from varying with the diverse condition. As a result, the rotation of an ultrasonic motor can be stabilized.

In the drive circuit relating to the aforesaid third embodiment, if the ratio of the ON and OFF periods of a switching element, that is; a duty ratio, is made variable, a drive voltage can be made variable without making the output voltage of a DC power supply variable.

A duty ratio setting circuit 4 can be added even to the first embodiment shown in FIG. 1. The present invention is applicable to a linear ultrasonic motor.

According to the invention, an ultrasonic motor drive circuit can be configured using only a few ordinary but not special parts. Since a drive frequency can be modified merely by modifying an inductive element value, the drive circuit can generate a sufficiently high drive voltage even for an ultrasonic motor using a high drive frequency. Moreover, the drive circuit can apply to other ultrasonic motors using different drive frequencies. The versatility is enhanced, and a drive voltage can be changed easily.

What is claimed is:

1. A drive circuit for an ultrasonic motor which comprises a stator for generating a progressive oscillatory wave to an elastic body with the drive of a piezoelectric element and a moving element to be pressurized by the stator and driven with the progressive oscillatory wave, comprising:
   first and second inductive means which are connected in series and inserted between a power source and an input of said ultrasonic motor;
   switching means which is connected between the junction of said first and second inductive means and a ground, and performs switching with a drive frequency of said ultrasonic motor; and
   capacitive means which is connected in parallel with said switching means.

2. A drive circuit according to claim 1, which comprises means for producing drive signals and means for setting duty ratio of said drive signals and then transferring said drive signals to said switching means to control said switching.

3. A drive circuit according to claim 2, further comprising third and fourth inductive means which are connected in series and inserted between said power source and another input of said ultrasonic motor;
   further switching means which is connected between the junction of said third and fourth inductive means and a ground, and performs switching with a drive frequency of aid ultrasonic motor; and
   further capacitive means which is connected in parallel with said further switching means,
   wherein said means for producing said drive signals produces further drive signals phase-shifted relative to the first-mentioned drive signals, and said means for setting duty ratio also sets duty ratio of said further drive signals and then transfers said further drive signals to said further switching means to control switching thereof.

4. A drive circuit according to claim 1, further comprising third and fourth inductive means which are connected in series and inserted between said power source and another input of said ultrasonic motor;
   further switching means which is connected between the junction of said third and fourth inductive means and a ground, and performs switching with a drive frequency of aid ultrasonic motor; and
   further capacitive means which is connected in parallel with said further switching means.

* * * * *